United States Patent

Chow

[15] 3,638,208

[45] Jan. 25, 1972

[54] MAGNETIC DOMAIN LOGIC CIRCUIT

[72] Inventor: Woo Foung Chow, Berkeley Heights, N.J.

[73] Assignee: Bell Telephone Laboratories, Incorporated, Murray Hill, Berkeley Heights, N.J.

[22] Filed: June 15, 1970

[21] Appl. No.: 46,126

[52] U.S. Cl. ....................................340/174 TF, 340/174 SR
[51] Int. Cl. ....................................G11c 21/00, G11c 11/14
[58] Field of Search ....................................340/174 TF

[56] References Cited

UNITED STATES PATENTS 3,530,446 9/1970 Perneski..........................340/174 TF
3,508,225 4/1970 Smith..............................340/174 TF

*Primary Examiner*—James W. Moffitt
*Attorney*—R. J. Guenther and Kenneth B. Hamlin

[57] ABSTRACT

A magnetic domain logic circuit is realized by designing a magnetically soft overlay to advance domains along a first or second channel depending on domain interactions. The presence or absence of a control domain for effecting the interaction is determined by the movement of a single control domain.

7 Claims, 3 Drawing Figures

INVENTOR
W. F. CHOW
BY Herbert M. Shapiro
ATTORNEY

MAGNETIC DOMAIN LOGIC CIRCUIT

FIELD OF THE INVENTION

This invention relates to data processing arrangements and, more particularly, to such arrangements including a material in which single wall domains can be moved.

BACKGROUND OF THE INVENTION

A single wall domain is a magnetic domain encompassed, in the plane of a material in which it can be moved, by a domain wall which closes on itself to form a stable entity free to move in the plane. A typical material for such an arrangement is a rare earth orthoferrite or a garnet crystal having a preferred direction of magnetization along an axis out of the plane of movement, nominally normal to the plane. It is convenient to designate one direction along that axis (viz, the positive direction) as the direction of the magnetization of the domain, the remainder of the material having its magnetization in the negative direction. Such a convention permits a domain to be represented as an encircled plus sign in a field of negative signs, or most simply as a circle. A single wall domain and an arrangement for manipulating such domains are disclosed in U.S. Pat. No. 3,460,116, of A. H. Bobeck, U. F. Gianola, R. C. Sherwood and W. Shockley, issued Aug. 5, 1969.

Single domains in a given sheet of material are constrained to a given diameter typically by a bias field of a polarity to constrict domains—a negative polarity according to the assumed convention. Domains are moved in the sheet by fields (viz, field gradients) which are provided in positions consecutively offset from the positions occupied by domains.

One implementation for providing suitable field gradients for effecting domain movement is an overlay of magnetically soft material which exhibits changing magnetic pole patterns in response to a magnetic field reorienting in the plane of the sheet in which single wall domains can be moved. The geometry of the overlay and the consecutive orientations of the in-plane field determine the consecutive positions for the attracting magnetic poles and thus the consecutive positions for domain patterns in the sheet. For a rotating in-plane field, T-shaped and bar overlay geometries have been found particularly suitable for defining a domain propagation channel. A domain propagation arrangement of this type is disclosed in copending application Ser. No. 732,705, filed May 28, 1968 for A. H. Bobeck and now U.S. Pat. No. 3,534,347.

The advantage of a domain propagation arrangement defined by magnetically soft overlays is that a spatially distributed propagation field pattern is achieved in the absence of electrical conductors resulting, for example, in a relatively simple and inexpensive arrangement particularly suited as a disc file. But the absence of electrical conductors implies that the arrangement is characterized by a field pattern uniformity which does not provide localized modifications for achieving a discrete function.

One discrete function which would be desirable in such an arrangement is a logic function. Of course, localized field modifications can be achieved by adding electrical conductors. Not only are the conductors expensive but, particularly for materials where domain size is small (say one-tenth mil), currents in the conductors produce unwanted effects because of the close proximity of domains to one another. Most desirably, logic functions are realized without conductors.

The spatially distributed (overlay) arrangement allows a number of degrees of freedom—operational parameters which are varied to achieve some selectivity in operation. Thus, for example, the in-plane field can be increased at a particular orientation to cause a domain generation or a channel switching operation. In each of these instances, however, the overlay geometry is designed to produce the desired operation in response to the increased in-plane field. Copending application Ser. No. 756,210, filed Aug. 29, 1968 for A. J. Perneski and now U.S. Pat. No. 3,555,527, discloses on of these arrangements. In still other arrangements, the need for increasing the in-plane field is eliminated as disclosed in copending application Ser. No. 795,148, and now U.S. Pat. No. 3,577,131 filed Jan. 30, 1969 for R. H. Morrow and A. J. Perneski, where domain interactions serve to route domains along alternative channels.

The realization of a number of logical functions as defined solely by the geometry of a magnetically soft overlay without electrical conductors extends the capability of an otherwise quite simple and attractive domain propagation arrangement.

BRIEF DESCRIPTION OF THE INVENTION

In accordance with an embodiment of this invention, a magnetically soft overlay is designed to define set and reset channels for domain movement in a slice of a material in which single wall domains can be moved. Channel selection is determined by the presence and absence of a control domain in a recirculating position in an auxiliary channel also defined by the overlay. The presence and absence of the control domain is determined, in turn, by the advance of a single domain in a set or reset input channel which is designed to lead to the recirculating position or bypass the recirculating position in a manner to dislodge domains there respectively.

In another embodiment a toggle flip-flop operation is achieved similarly by a modification of the overlay arrangement of the above-described embodiment.

DETAILED DESCRIPTION

Figure 1:
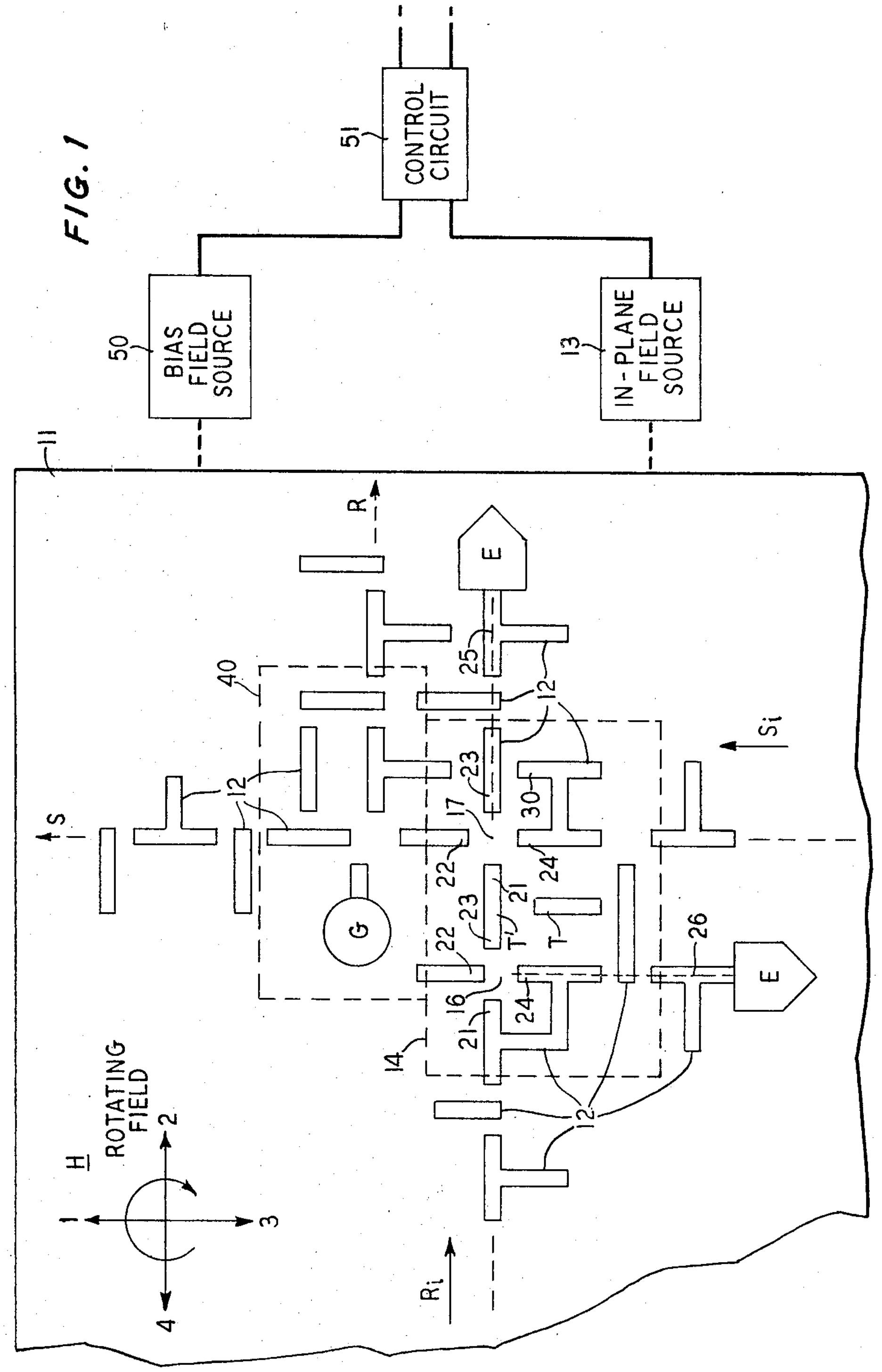
FIG. 1 is a schematic illustration of a set-reset logic arrangement in accordance with this invention.

FIG. 1 shows a set-reset circuit in accordance with this invention. The circuit comprises a slice 11 of a material in which single wall domains can be moved. A plurality of magnetically soft overlay elements 12 are disposed on the surface of slice 11 for defining a set-reset operation illustratively in response to a magnetic field rotating clockwise in the plane of slice 11. The rotating in-plane field is generated by familiar means represented in FIG. 1 by block 13.

The overall operation performed by the overlay may be understood conveniently in terms of two building blocks representing functions which interact with one another. The first of these blocks is indicated by the broken closed line 14 in FIG. 1. The overlay elements in block 14 define first and second recirculating or idler positions 16 and 17 in each of which a domain occupies a sequence of positions 21, 22, 23, and 24. Familiar bar and T-shaped overlay elements define a domain propagation channel for advancing a domain from inputs, not shown, to recirculating positions 16 and 17. The input channels are designated $R_i$ and $S_i$ for reset and set operations respectively. To be specific, a domain advanced along channel $S_i$ will be seen to cause a set operation and a domain advanced along channel $R_i$ will be seen to cause a reset operation.

Auxiliary propagation channels 25 and 26 are also defined by the overlay elements of block 14. These channels lead to domain annihilators each of which comprises, for example, a permalloy disc with a domain moving about its periphery as disclosed in copending application Ser. No. 795,148, supra. The annihilators are represented in FIG. 1 by blocks designated E because they are commonly referred to as domain (bubble) eaters.

Consider the case when a domain is advanced upward along channel $S_i$ as viewed in FIG. 1. Assume that no domain is present in idler 17. The in-plane field is assumed to be rotating clockwise as indicated by the arrow notation, designated H, in the upper left corner of sheet 11 in FIG. 1. The domain moves to positions 24, 21, 22, 23, 24, . . . , etc., as the in-plane field rotates. The domain stays in this position causing a set operation, as will become clear, until the circuit is reset.

In order to reset the circuit, a domain is advanced to the right, along channel $R_i$, as viewed in FIG. 1, toward idler 16. The domain enters position 16 occupying the positions 21, 22, 23, and 24 there consecutively as the in-plane field goes through the orientations 2, 3, 4, and 1 as shown in FIG. 1. But the spacing of element T of FIG. 1 apart from element T' rather than the connection of the two elements to form a T-shaped overlay ensures that any domain moved into 16 moves directly down channel 26 to a domain annihilator. Consequently, idler 16 is not a true idler in the sense that a domain constantly recirculates there until dislodged. Rather, it is a modified idler ensuring a single circulation followed by the departure of the domain from the idler—a "turning" position.

While a reset domain is in turning position 16 it functions to dislodge any set domain in idler 17. To be specific, because of the repulsion forces which exist between (like-charged) domains, the presence of a domain in turning position 16, moving from position 23 to 24 there, prevents a domain in idler position 17 from moving from position 23 to 24 in that idler. Instead, the domain in idler 17 moves to position 30 of FIG. 1, thus being dislodged from the idler for movement along channel 25.

We have now seen that a domain advanced along the set input channel, occupies idler 17 for continuous recirculation there and a domain advanced along the reset channel dislodges that domain. Let us now consider the two cases where a domain advances along the set channel when a domain already occupies idler 17 and where a domain is advanced along the reset channel when no domain occupies idler 17 to demonstrate that only negligible variations in the operation result. Thereafter, we will consider the use of the presence and absence of a domain in idler 17 for effecting a set or reset operation respectively.

Figure 2:
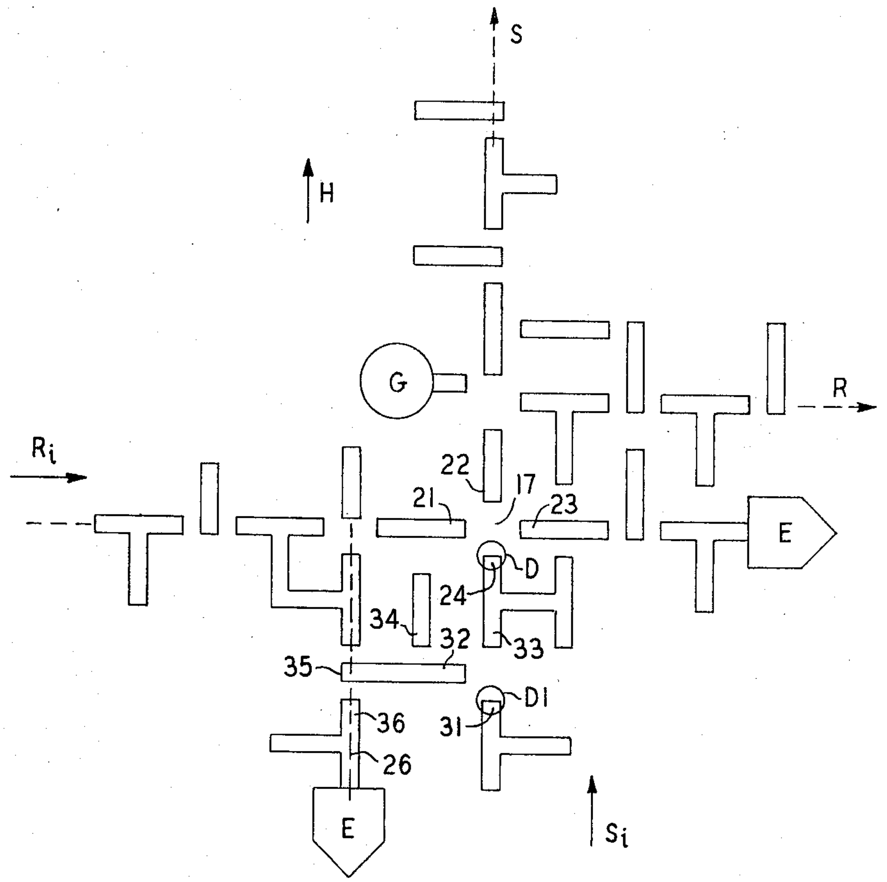
FIGS. 2 and 3 are schematic illustrations of portions of the arrangement of FIG. 1 showing magnetic conditions therein during operation.

FIG. 2 shows the overlay pattern of FIG. 1 with a domain D occupying position 24 of idler 17. The in-plane field is directed upward as indicated by the arrow H in the figure. When the field is in this orientation, the domain D1 advancing in channel S is in the position 31. When the field next rotates to the right (to orientation 2 of FIG. 1), domain D1 moves to position 32 and domain D moves to position 21. When the domain rotates further clockwise, domain D moves to position 22 and domain D1 moves to position 34, position 33 being denied to it by the presence of domain D in close proximity. In response to further rotation on the in-plane field, domain D1 moves to positions 35, 36, . . . etc., down channel 26 to domain annihilator E at the end of that channel.

We have already seen that a domain moving along the reset channel, when idler 17 is occupied by a domain, moves through turning position 16 down channel 26 to a domain annihilator. The same operation takes place if a domain is absent from idler 17. The overlay geometry is such that a domain in the reset channel cannot move to idler 17. Accordingly, the domain makes one circulation in 16 and then moves down channel 26 regardless of whether idler 17 is occupied or not because of the geometry of the overlay.

Figure 3:
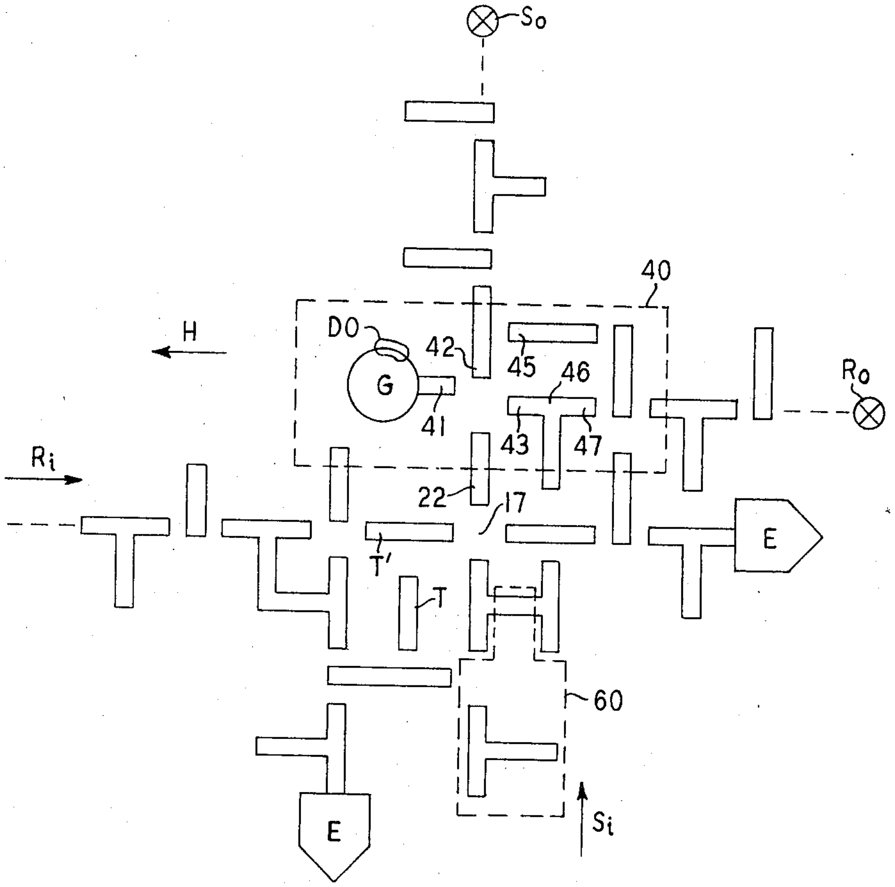

FIG. 3 shows the overlay arrangement of FIG. 1 with the second function indicated by broken block 40. The overlay in the block includes a domain generator, designated G, about which a "seed" domain moves continuously for generating a domain for each cycle of the in-plane field as is well understood in the art. Domains so generated move along set or reset output channels S and R to outputs each indicated by an encircled X and designated $S_0$ and $R_0$ respectively in FIG. 3.

If a domain is present in idler 17 of FIG. 3, it occupies position 22 when a domain newly generated at G occupies position 42. Interaction between the domains denies position 43 to the newly generated domain when the in-plane field (H) next reorients to the left as viewed in the drawing. The newly generated domain instead moves to position 45 for movement to the set output $S_o$. So long as idler 17 is occupied, any newly generated domains move in this manner for providing outputs at $S_o$.

If a domain is absent from idler 17, any newly generated domain, at G, moves sequentially through positions 41, 42, 43, 46, 47 . . . to the reset output $R_o$.

Detection of outputs at $S_o$ and $R_o$ can be realized by a number of known means such as by a Hall effect device or by an electrical conductor pickup loop or by optical means. Copending application Ser. No. 882,900, filed Dec. 8, 1969 for W. Strauss discloses one suitable detection means. It is contemplated, further, that a set-reset arrangement in accordance with this invention would be defined on a portion of a slice of material in which many other functions are also defined. In such a case, the set and reset outputs, as well as the set and reset inputs, may comprise merely overlay geometries effecting movement of domains to and from other functional areas of the slice.

The domain size in slice 11 of FIG. 1 is maintained usually by a bias field of a polarity to constrict domains. The field is provided by familiar coil arrangements or permanent magnets represented in FIG. 1 by block 50.

The bias field source and the in-plane field source as well as other input and detector apparatus (not shown) are connected to a control circuit represented by block 51 in FIG. 1 for synchronization and control. The control circuit may be any such circuits capable of operating in accordance with this invention.

A toggle flip-flop arrangement is realized by a modification of the overlay geometry of FIG. 1. The most important modification comprises the omission of the set input channel. The omitted elements are encompassed by the broken block indication 60 in FIG. 3. In addition, the reset channel is adapted to move domains into idler 17 by the movement of element T upward as viewed in FIG. 3 to form a T-shape with element T'. In operation, a domain advanced along the reset channel lodges in idler 17. A second domain advanced along the reset channel dislodges the first domain and itself is deflected to channel 26 for annihilation. For toggle flip-flop operation, the input is usually called the clock input rather than the reset input. The interaction with the overlay area of block 40 and domains moving therein and the domain in idler 17 is entirely analogous to that of the embodiment of FIG. 1.

What has been described is considered only illustrative of the principles of this invention. Therefore, variations of the invention can be devised by those skilled in the art in accordance with those principles within the spirit and scope of this invention.

What is claimed is:

1. A magnetic logic arrangement comprising a material in which single wall domains can be moved, and a magnetically soft overlay adjacent said material for exhibiting changing magnetic pole patterns in response to a magnetic field reorienting in a plane of movement for domains in said material, said overlay comprising elements having geometries and being disposed to define an idler position and a first propagation channel for said domains, said first channel being adapted to move a first domain to said idler position when said position is free of domains and including means to annihilate said first domain when a domain is present in said idler position.

2. An arrangement in accordance with claim 1 also including a second domain propagation channel, said channel being adapted to move a second domain to dislodge a domain in said idler position and including means for annihilating second domains so moved in said second channel.

3. An arrangement in accordance with claim 1 wherein said overlay defines third and fourth domain propagation channels and means for providing domains for movement along said third or fourth channel depending on the presence or absence of a domain in said idler position respectively.

4. An arrangement in accordance with claim 2 wherein said overlay defines third and fourth domain propagation channels and means for providing domains for movement along said third or fourth channel depending on the presence or absence of a domain in said idler position respectively.

5. An arrangement in accordance with claim 3 wherein said overlay comprises bar and T-shaped elements for providing said changing pole patterns in response to a rotating in-plane field.

6. An arrangement in accordance with claim 1 wherein said overlay is of a geometry for dislodging any domain present in said idler position when said first domain is moved along said first channel, and means for annihilating domains so dislodged.

7. A magnetic logic arrangement comprising a material in which single wall domains can be moved, a plurality of magnetically soft overlay elements adjacent said material and exhibiting changing magnetic pole patterns in response to a magnetic field reorienting in a plane of movement for domains in said material, said overlay elements defining in said plane an idler position, means for dislodging a single wall domain from said idler position, means for annihilating domains so dislodged, and means for supplying a domain to said idler position, said overlay also defining first and second domain propagation channels and means for providing a domain for movement in said first or second propagation channel depending on the presence or absence of a domain in said idler position.

* * * * *